(12) United States Patent
Jourdin et al.

(10) Patent No.: US 11,582,976 B2
(45) Date of Patent: Feb. 21, 2023

(54) METHOD FOR THE PREPARATION OF A FOOD PRODUCT FERMENTED UNDER VACUUM

(71) Applicant: CUISINE SOLUTION EUROPE, Heudebouville (FR)

(72) Inventors: Christophe Jourdin, Heudebouville (FR); Hervé Chignon, Heudebouville (FR); Olivier Marquet, Heudebouville (FR)

(73) Assignee: CUISINE SOLUTION EUROPE, Heudebouville (FR)

( * ) Notice: Subject to any disclaimer, the term of this patent is extended or adjusted under 35 U.S.C. 154(b) by 178 days.

(21) Appl. No.: 16/884,407

(22) Filed: May 27, 2020

(65) Prior Publication Data

US 2021/0329928 A1    Oct. 28, 2021

(30) Foreign Application Priority Data

Apr. 23, 2020   (FR) ....................... 2004061

(51) Int. Cl.
*A21D 10/02* (2006.01)
*A21D 6/00* (2006.01)
*A21D 8/02* (2006.01)

(52) U.S. Cl.
CPC ........... *A21D 10/025* (2013.01); *A21D 6/008* (2013.01); *A21D 8/02* (2013.01)

(58) Field of Classification Search
CPC . A21D 6/008; A21D 8/04; A21D 8/02; A21D 13/32; A21D 10/025; A21D 6/001
USPC .............................................. 426/8
See application file for complete search history.

(56) References Cited

U.S. PATENT DOCUMENTS 5,002,789 A * 3/1991 Graf .................. A23L 5/42
426/250
2008/0063758 A1   3/2008 Kwiat et al.

FOREIGN PATENT DOCUMENTS

DE       19730628 A1    1/1999
EP        1900642 A1    3/2008

OTHER PUBLICATIONS

Yuichi Tadano JP59-106250A machine translation of description (Year: 1984) (Year: 1984).*
Database WPI; Week 200236; Thomson Scientific, London, GB, Jan. 22, 2002.
Aug. 7, 2020 Search Report issued in French Patent Application No. 2004061.

\* cited by examiner

*Primary Examiner* — Subbalakshmi Prakash
(74) *Attorney, Agent, or Firm* — Oliff PLC

(57) ABSTRACT

Preparation of a food product comprising a bakery portion and ingredients may include: a first step for preparing the ingredients, a second step for preparing dough, a third step for preparing dough pieces, a step for packaging, in which the dough pieces and the ingredients are assembled and disposed in an impermeable pouch which is vacuum sealed, a step for fermentation, a step for cooking, and a step for cooling.

9 Claims, 1 Drawing Sheet

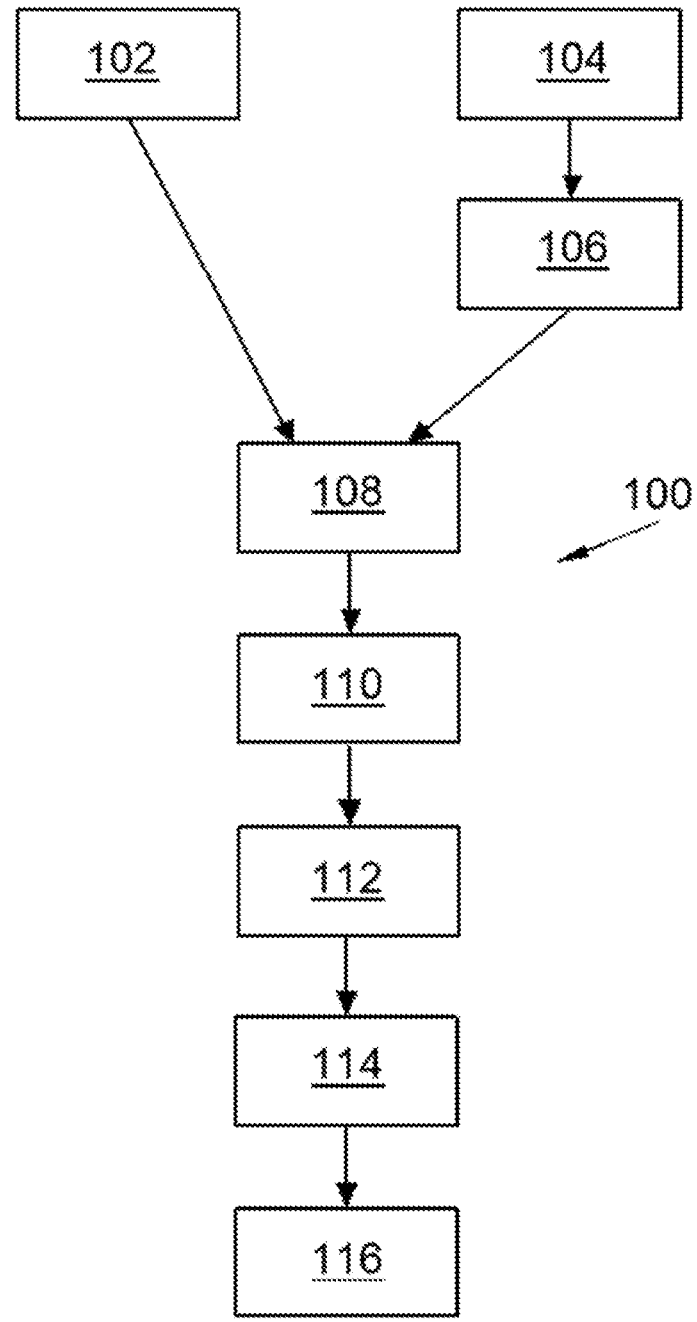

METHOD FOR THE PREPARATION OF A FOOD PRODUCT FERMENTED UNDER VACUUM

TECHNICAL FIELD

The present invention relates to a method for the preparation of a product fermented under vacuum, in particular of the sandwich or burger type.

PRIOR ART

The preparation of a sandwich or a burger currently consists of separately preparing the bread and the filling, then introducing the filling into the bread and finally, and optionally, introducing the assembly into a protective pouch which may or may not be evacuated of air by adding a gas which favours the preservation of the product.

That type of preparation has the disadvantage, inter alia, of being handled by a variety of people during its production; this could lead to contaminating substances or germs being deposited on the preparation.

Thus, it is necessary to find a preparation method which prevents the appearance of contamination of this type.

DISCLOSURE OF THE INVENTION

One aim of the present invention is to propose a method for the preparation of a food product which is fermented under vacuum, which prevents any contact with the food product right from the start of its preparation.

To this end, a method for the preparation of a food product is proposed which comprises a bakery portion and ingredients, said method comprising:
- a first step for preparation, during which the ingredients are prepared,
- a step for provision, during which dough pieces are provided,
- a step for packaging, during which the dough pieces provided in this manner and the ingredients prepared in this manner are assembled into an assembly and disposed in an impermeable pouch which is vacuum sealed,
- a step for fermentation, during which the dough pieces contained in the assembly, constituted by the dough pieces and the ingredients and enclosed in the impermeable pouch, undergo fermentation,
- a step for cooking, during which the assembly fermented in the impermeable pouch in this manner undergoes cooking, and
- a step for cooling, during which the assembly in the impermeable pouch is cooled.

Thus, such a preparation method can be used to introduce all of the elements into the pouch right at the start of the preparation and before cooking which, inter alia, avoids contamination after cooking.

Advantageously, following the cooling step, the preparation method comprises a step for deep freezing the assembly in the impermeable pouch.

Advantageously, during the first preparation step, the ingredients used are raw.

Advantageously, the provision step consists of defrosting the pieces of deep frozen dough.

Advantageously, the provision step comprises a second preparation step, during which the dough piece of the bakery portion is prepared, and a third preparation step, during which the dough obtained from the second preparation step undergoes a sub-step for division, during which dough pieces are shaped, and a sub-step for shaping, during which each dough piece is shaped into the desired shape for the bakery portion.

Advantageously, the preparation method comprises, between the preparation step and the packaging step, a step for surface colouring, during which the outer surface of the dough pieces is coloured.

Advantageously, the ingredients are surface coloured during the first preparation step.

Advantageously, during the packaging step and after vacuum sealing, the preparation method comprises a step for injecting carbon dioxide or nitrogen, during which said gas is injected before sealing the pouch.

BRIEF DESCRIPTION OF THE DRAWINGS

The aforementioned characteristics of the invention and more will become clearer from the following description of an exemplary embodiment, said description being made in association with the accompanying drawings, in which:

FIG. 1 diagrammatically illustrates an algorithm for a method for the preparation of a food product in accordance with the invention.

DETAILED DESCRIPTION OF EMBODIMENTS

FIG. 1 shows a method 100 for the preparation of a food product of the sandwich or burger type, which is constituted by a bakery portion and ingredients which are disposed in the bakery portion. The bakery portion is produced from raw ingredients which are traditional in baking, in particular such as flour, water, yeast and salt.

The preparation method 100 comprises a first preparation step 102, during which the ingredients are prepared. These ingredients may be of different forms; as an example, they may be vegetables, raw or cooked meat products, sauces, etc.

The preparation method 100 comprises a provision step 104, 106 during which the dough pieces of bakery dough are provided.

In accordance with a particular embodiment, deep frozen pre-proofed pieces of dough are received and are defrosted during said provision step, and the provision step then consists of defrosting the deep frozen dough pieces of dough.

In the embodiment of the invention presented here, the provision step comprises a second preparation step 104 and a third preparation step 106.

The dough piece for the bakery portion is prepared during the second preparation step 104. The second preparation step 104 comprises, inter alia, a sub-step for formulation, which consists of mixing the ingredients from which the dough of the bakery portion is composed, a sub-step for kneading and a sub-step for fermentation, which constitutes a first fermentation of the bakery portion.

During the third preparation step 106, the dough obtained from the second preparation step 104 undergoes, inter alia, a sub-step for division during which the dough pieces are shaped, and a sub-step for shaping, during which each dough piece is shaped into the desired shape for the bakery portion.

The preparation method 100 then comprises a step 108 for packaging, during which the dough pieces which have been provided in this manner and the ingredients which have been prepared in this manner are assembled into an assembly and disposed in an impermeable pouch which is vacuum sealed.

This may, for example, consist of placing the ingredients between two dough pieces in order, at the end, to constitute a sandwich with the ingredients inside.

The impermeable pouch may have any possible shape such as, for example, a flexible pouch or a carton.

The preparation method 100 then continues with a fermentation step 110, during which the dough pieces contained in the assembly constituted by dough pieces and the ingredients and enclosed in the impermeable pouch undergo a fermentation under the combined effect of the yeasts and temperature. After fermentation of the bakery portion, the dough pieces have been transformed into proved bread which is ready to bake.

In accordance with a particular embodiment, the fermentation step is carried out over a period in the range 30 minutes to 24 hours, and in a range of temperatures which is between 5° C. and 40° C.

The assembly in the impermeable pouch then undergoes a cooking step 112, during which the assembly which has been fermented in this manner in the impermeable pouch undergoes cooking, in particular in an oven. Cooking may, for example, be carried out over a period in the range 1 hour to 3 hours, and in a range of temperatures which is between 80° C. and 220° C.

The assembly then undergoes a cooling step 114, during which the assembly in the impermeable pouch is cooled. This cooling step 114 may, for example, be carried out by introducing the assembly in the impermeable pouch into a refrigerated receptacle, for example for a period which is between 1 hour and 5 hours, and in a range of temperatures which is between −20° C. and +10° C. In accordance with a further embodiment, the assembly in the impermeable pouch may be immersed in a fluid held at a very low temperature such as, for example, in brine at −18° C.

Following the cooling step 114, the preparation method 100 may comprise a step 116 for deep freezing the assembly in the impermeable pouch.

The preparation method 100 may be used to obtain an assembly which is pasteurized in its packaging at the completion of the cooking step 112, which ensures a long shelf life without organoleptic or microbiological deterioration of the components.

Furthermore, because the assembly is protected in the impermeable pouch, it may be deep frozen without risk of contamination or deterioration of the surface properties and the assembly is not touched and can be brought up to temperature in its packaging with no risk of contamination.

The destruction of microorganisms during the cooking step 112 guarantees the safety of the food.

As detailed above, the ingredients may be cooked or raw before being introduced into the vacuum pouch but, in order to save time, it is preferable to introduce raw ingredients which will be cooked at the same time as the bread dough during the cooking step 112. Thus, during the first preparation step 102, the ingredients used are raw.

In order to improve the visual appearance of the outer surface of the bread at the end of the preparation method 100, a step for surface colouring may be carried out between the preparation step 106 and the packaging step 108. This colouring step consists of colouring the outer surface of the dough pieces, for example by applying a high temperature of 220° C. to the outer surface of the dough piece for 3 minutes using infrared radiation, or by contact with a conveyor belt heated to this temperature.

In the same manner, the ingredients may be surface coloured during the first preparation step 102. One example of this type of colouring consists of grilling a chicken fillet for 2 minutes by exposing it to a temperature of 220° C. in order to obtain a visual modification of the surface without in any way cooking the core by direct or indirect contact with a source of heat maintained at high temperature.

In order to detach the pouch from the upper surface of the bakery portion, during the packaging step and after the evacuation of the air, the preparation method 100 comprises a step for injecting carbon dioxide or nitrogen, during which said gas is injected before sealing the pouch.

The invention claimed is:

1. A method for preparation of a food product comprising a bakery portion and ingredients that are disposed in the bakery portion, said method comprising:
   a first step for preparation, during which the ingredients are prepared,
   a step for provision, during which dough pieces are provided,
   a step for packaging, during which (1) the dough pieces and the ingredients are assembled into an assembly by disposing the ingredients in an interior portion of the bakery portion, and (2) prior to fermentation of the dough, the assembly is disposed in an impermeable pouch which is then vacuum sealed,
   a step for fermentation, during which the dough pieces contained in the assembly, constituted by the dough pieces and the ingredients and enclosed in the impermeable pouch, undergo fermentation,
   a step for cooking, during which the assembly fermented in the impermeable pouch undergoes cooking in the impermeable pouch, and
   a step for cooling, during which the assembly in the impermeable pouch is cooled.

2. The preparation method according to claim 1, wherein, following the cooling step, the preparation method comprises a step for deep freezing the assembly in the impermeable pouch.

3. The preparation method according to claim 1, wherein during the first preparation step, the ingredients used are raw.

4. The preparation method according to claim 1, wherein the provision step consists of defrosting the pieces of deep frozen dough.

5. The preparation method according to claim 1, wherein the provision step comprises a second preparation step, during which the dough piece of the bakery portion is prepared, and a third preparation step, during which the dough obtained from the second preparation step undergoes a sub-step for division, during which dough pieces are shaped, and a sub-step for shaping, during which each dough piece is shaped into the desired shape for the bakery portion.

6. The preparation method according to claim 4, wherein the preparation method comprises, between the preparation step and the packaging step, a step for surface colouring, during which the outer surface of the dough pieces is coloured.

7. The preparation method according to claim 1, wherein the ingredients are surface coloured during the first preparation step.

8. The preparation method according to claim 1, wherein, during the packaging step but before vacuum sealing, the preparation method comprises a step for injecting carbon dioxide or nitrogen, during which said gas is injected before sealing the pouch.

9. The preparation method according to claim 5, wherein the preparation method comprises, between the preparation step and the packaging step, a step for surface colouring, during which the r surface of the dough pieces is coloured.

\* \* \* \* \*